United States Patent
Woo et al.

(10) Patent No.: US 9,914,851 B2
(45) Date of Patent: Mar. 13, 2018

(54) COMPOSITION FOR WINDOW FILM, FLEXIBLE WINDOW FILM MANUFACTURED USING THE SAME AND FLEXIBLE DISPLAY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Chang Soo Woo, Uiwang-si (KR); Kyoung Ku Kang, Uiwang-si (KR); Min Hye Kim, Uiwang-si (KR); Ji Sun Im, Uiwang-si (KR); Seung Woo Jang, Uiwang-si (KR); Dong Il Han, Uiwang-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 0 days.

(21) Appl. No.: 14/956,287

(22) Filed: Dec. 1, 2015

(65) Prior Publication Data

US 2016/0152866 A1 Jun. 2, 2016

(30) Foreign Application Priority Data

Dec. 2, 2014 (KR) .................. 10-2014-0170878

(51) Int. Cl.
| | | |
|---|---|---|
| C09D 183/06 | (2006.01) |
| G02B 5/30 | (2006.01) |
| G02B 1/14 | (2015.01) |
| G02B 1/04 | (2006.01) |
| B32B 27/28 | (2006.01) |
| G06F 3/041 | (2006.01) |
| C08G 77/14 | (2006.01) |

(52) U.S. Cl.
CPC .......... *C09D 183/06* (2013.01); *B32B 27/283* (2013.01); *G02B 1/04* (2013.01); *G02B 1/14* (2015.01); *G02B 5/3033* (2013.01); *G06F 3/041* (2013.01); *C08G 77/14* (2013.01); *G06F 2203/04102* (2013.01)

(58) Field of Classification Search
CPC .................................................. B32B 27/283
USPC ........................................ 428/428, 429, 447
See application file for complete search history.

(56) References Cited

U.S. PATENT DOCUMENTS

| | | | | |
|---|---|---|---|---|
| 5,449,731 A | * | 9/1995 | Suzuki | G02B 1/041 526/322 |
| 2008/0097066 A1 | * | 4/2008 | Tsuchida | C09D 183/04 528/26 |
| 2011/0317239 A1 | * | 12/2011 | Mori | C08G 77/14 359/241 |
| 2015/0155526 A1 | * | 6/2015 | Lee | G06F 3/0412 438/27 |

FOREIGN PATENT DOCUMENTS

| | | |
|---|---|---|
| KR | 10-2014-0004568 A | 1/2014 |
| KR | 10-2014-0134147 A | 11/2014 |
| TW | 201033289 A | 9/2010 |
| WO | WO 2009/090867 A1 * | 7/2009 |

OTHER PUBLICATIONS

"Embedded Antifuse NVM: A Mission of Critical IP for Display Driver ICs" authored by Cheng and available online at the url www.embedded.com/print/4215607.*
Machine translation of WO 2009/090867 into English.*
Taiwan Office action dated Jun. 17, 2016, corresponding to Taiwanese Patent Application No. 104140241 (4 pages).
Korean Office action dated Dec. 1, 2016, corresponding to Korean Patent Application No. 10-2014-0170878 (6 pages).

* cited by examiner

*Primary Examiner* — Marc S Zimmer
(74) *Attorney, Agent, or Firm* — Lewis Roca Rothgerber Christie LLP

(57) ABSTRACT

A composition for a window film includes a siloxane resin represented by Formula 1, and an initiator. A flexible window film is manufactured using the same, and has a pencil hardness of about 7H or higher, a radius of curvature of about 5.0 mm or lower, and a difference in yellow index before and after irradiation (ΔY.I.) of about 5.0 or less. A flexible display includes the flexible window film.

$$(R^1SiO_{3/2})_x(R^2R^3SiO_{2/2})_y \quad \text{Formula 1}$$

17 Claims, 3 Drawing Sheets

COMPOSITION FOR WINDOW FILM, FLEXIBLE WINDOW FILM MANUFACTURED USING THE SAME AND FLEXIBLE DISPLAY INCLUDING THE SAME

CROSS-REFERENCE TO RELATED APPLICATION

This application claims priority to and the benefit of Korean Patent Application No. 10-2014-0170878, filed on Dec. 2, 2014 in the Korean Intellectual Property Office, the entire content of which is incorporated herein by reference.

BACKGROUND

1. Technical Field

Embodiments of the present invention relate to a composition for a window film, a flexible window film manufactured using the same, and a flexible display including the same.

2. Description of the Related Art

Recently, glass substrates (or high-hardness substrates) in displays are being replaced by films in order to develop flexible displays capable of being folded and unfolded. Since the flexible displays are thin and lightweight, and can be folded and unfolded, these flexible displays can be manufactured into various shapes.

For the flexible displays, various devices and substrates included therein are also required to have flexibility. In particular, since the window film is disposed at the outermost side of the flexible display, the window film is required to have flexibility, high hardness, and optical reliability.

SUMMARY

In accordance with embodiments of the present invention, a composition for a window film may include: a siloxane resin represented by Formula 1, and an initiator.

Formula 1

In Formula 1, $R^1$, $R^2$ and $R^3$ are as defined in the following detailed description; and $0<x<1$, $0<y<1$, and $x+y=1$.

In accordance with embodiments of the present invention, a flexible window film may include a base layer and a coating layer formed on one surface of the base layer. The coating layer may be formed of the composition for a window film as set forth herein.

In accordance with embodiments of the present invention, a flexible display may include the flexible window film as set forth herein.

DETAILED DESCRIPTION

Figure 1:
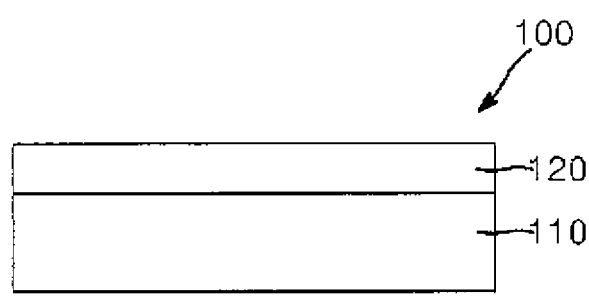
FIG. 1 is a schematic cross-sectional view of a flexible window film according to embodiments of the present invention.

Exemplary embodiments of the present invention are described in detail with reference to the accompanying drawings. It is understood that the present invention is not limited to the following embodiments and may be embodied in different ways. In the drawings, portions irrelevant to the description are omitted for clarity. Like components are denoted by like reference numerals throughout the specification.

As used herein, spatially relative terms such as "upper side" and "lower side" are defined with reference to the accompanying drawings. Thus, it is understood that the term "upper side" can be used interchangeably with the term "lower side". It is understood that when an element such as a layer, film, region or substrate is referred to as being placed "on" another element, it can be placed directly on the other element, or intervening layer(s) may be present. On the other hand, when an element is referred to as being placed "directly on" another element, intervening layer(s) are not present.

Herein, "pencil hardness" is measured on a coating layer of a window film using a pencil hardness tester (Heidon Co., Ltd.) in accordance with JIS K5400. In measuring pencil hardness, pencils (Mitsubishi Co., Ltd.) having a pencil hardness of 6B to 9H are used. Specifically, pencil hardness is measured under a load of 1 kg on the coating layer, a scratching angle of 45°, and a scratching speed of 60 mm/min. When the coating layer has one or more scratches after being tested 5 times using a certain pencil, the pencil hardness is measured again using another pencil having a hardness one-level lower than the previous pencil. The maximum pencil hardness value of the pencil that allows no scratches to be observed all five times on the coating layer is taken as the pencil hardness of the coating layer after pencil hardness is repeatedly measured five times.

As used herein, the term "radius of curvature" refers to the minimum radius of the jig that causes no cracks on a window film specimen subjected to radius of curvature testing. In particular, the radius of curvature test involves winding the window film specimen (having a size of 3 cm×15 cm (width×length)) around the jig (CFT-200R, COVOTECH Co., Ltd.), keeping it wound for 5 seconds, unwinding, and then observing with the naked eye whether the specimen suffers from cracking. Here, the radius of curvature in the compressive direction is measured when the specimen is wound around the jig such that the coating layer of the window film contacts the surface of the jig. The radius of curvature in the tensile direction is measured when the specimen is wound around the jig such that the base layer of the window film contacts the jig. Here, the window film specimen may have a thickness of 50 µm to 300 µm.

As used herein, the term "ΔY.I." refers to the difference in the yellow index (Y2-Y1) before and after light irradiation. Measurement of the yellow index (Y1) is done under a D65 light source and 2° angle between the window coating layer and the light source using a colorimeter (CM3600D, Konica Minolta). After measuring the yellow index (Y1), the window film is irradiated with light at a peak wavelength of 306 nm for 72 hours using a light resistance tester (Xe-1, Q-sun Co., Ltd.), and then the yellow index (Y2) is measured in the same manner as the yellow index (Y1).

As used herein, the term "(meth)acryl" refers to acryl and/or methacryl.

Unless otherwise stated, the term "substituted" as used herein means that at least one hydrogen atom of the functional group is substituted with a hydroxyl group, an unsubstituted $C_1$ to $C_{10}$ alkyl group, a $C_1$ to $C_{10}$ alkoxy group, a $C_3$ to $C_{10}$ cycloalkyl group, a $C_6$ to $C_{20}$ aryl group, a $C_7$ to $C_{20}$ arylalkyl group, a benzophenone group, a $C_1$ to $C_{10}$ alkyl group-substituted $C_6$ to $C_{20}$ aryl group, or a $C_1$ to $C_{10}$ alkoxy group-substituted $C_1$ to $C_{10}$ alkyl group.

As used herein, the term "crosslinkable functional group" refers to functional groups crosslinked by heat and/or light. For example, the crosslinkable group may refer to an epoxy group, an epoxy group-containing group, a glycidyl group, a glycidyl group-containing group, a glycidoxy group, a glycidoxy group-containing group, an oxetanyl group, an oxetanyl group-containing group, or the like. In some embodiments, the crosslinkable group may refer to an epoxy group; a glycidyl group; a glycidoxy group; an oxetanyl group; an oxetanyloxy group; a $C_1$ to $C_{20}$ alkyl group having an epoxy group, glycidyl group, glycidoxy group, epoxidized $C_5$ to $C_{20}$ cycloalkyl group, epoxidized $C_1$ to $C_{10}$ alkyl group, oxetanyl group, or oxetanyloxy group; or a $C_5$ to $C_{20}$ cycloalkyl group having an epoxy group, glycidyl group, glycidoxy group, epoxidized $C_5$ to $C_{20}$ cycloalkyl group, epoxidized $C_1$ to $C_{10}$ alkyl group, oxetanyl group, or oxetanyloxy group. The "crosslinkable functional group" may be substituted or unsubstituted.

As used herein, the symbol "Ec" represents a (3,4-epoxycyclohexyl)ethyl group, the symbol "Me" represents a methyl group, the symbol "Gp" represents a 3-glycidoxypropyl group, and the symbol "Op" represents a 3-oxetanylpropyl group.

As used herein, the term "halogen" refers to fluorine, chlorine, bromine, or iodine.

According to embodiments of the present invention, a composition for a window film may include: a siloxane resin represented by Formula 1; and an initiator.

   Formula 1

In Formula 1, $R^1$ is a crosslinkable functional group. $R^2$ and $R^3$ are each independently hydrogen, a crosslinkable functional group, an unsubstituted or substituted $C_1$ to $C_{20}$ alkyl group, or an unsubstituted or substituted $C_5$ to $C_{20}$ cycloalkyl group. At least one of $R^2$ and $R^3$ is an unsubstituted or substituted $C_1$ to $C_{20}$ alkyl group. Also, $0<x<1$, $0<y<1$, and $x+y=1$.

The composition for a window film according to embodiments includes the siloxane resin represented by Formula 1, thereby improving the hardness and flexibility of the window film. In addition, the siloxane resin represented by Formula 1 is prepared by adjusting the proportions of each of the silicone monomers, i.e., $(R^1SiO_{3/2})$ and $(R^2R^3SiO_{2/2})$, thereby enabling adjustment of the hardness and flexibility of the window film. For example, x and y may be about 0.20 to about 0.999 and about 0.001 to about 0.80, respectively. For example, x and y may be about 0.20 to about 0.99 and about 0.01 to about 0.80, respectively. In some embodiments, for example, x and y may be about 0.80 to about 0.99 and about 0.01 to about 0.20, respectively. Within these ranges, the window film can have good hardness and flexibility. For example, when x is about 0.80 to about 0.99 and y is about 0.01 to about 0.20, the window film (having a polyester film (such as a polyimide film, a polyethylene terephthalate film or the like) as the base layer) can have better flexibility and optical reliability.

$R^1$ in Formula 1 can provide crosslinkability to the composition for a window film. In some embodiments, $R^1$ may include (3,4-epoxycyclohexyl)methyl, (3,4-epoxycyclohexyl)ethyl, (3,4-epoxycyclohexyl)propyl, 3-glycidoxypropyl, 3-oxetanylmethyl, 3-oxetanylethyl, 3-oxetanylpropyl, 3-oxetanyloxy groups, and/or the like.

$R^2$ and $R^3$ in Formula 1 can provide crosslinkability and flexibility to the composition for a window film. In some embodiments, $R^2$ may be an unsubstituted or substituted $C_1$ to $C_{20}$ alkyl group, and $R^3$ may be a crosslinkable functional group. Accordingly, crosslinkability of the composition for a window film can be further improved, thereby further improving the hardness of the window film. In some embodiments, for example, $R^2$ and $R^3$ may each independently include (3,4-epoxycyclohexyl)methyl, (3,4-epoxycyclohexyl)ethyl, (3,4-epoxycyclohexyl)propyl, glycidoxy propyl, methyl, ethyl groups, and/or the like.

In some embodiments, the siloxane resin represented by Formula 1 may include a compound represented by any one of Formulae 1-1 to 1-18, but the siloxane resin is not limited thereto.

   Formula 1-1

   Formula 1-2

   Formula 1-3

   Formula 1-4

   Formula 1-5

   Formula 1-6

   Formula 1-7

   Formula 1-8

   Formula 1-9

In Formulae 1-1 through 1-9, $0<x<1$, $0<y<1$, and $x+y=1$.

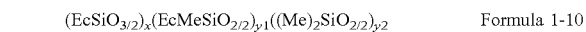   Formula 1-10

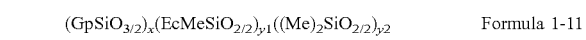   Formula 1-11

   Formula 1-12

   Formula 1-13

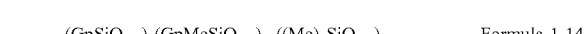   Formula 1-14

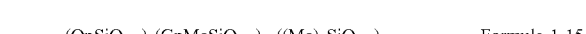   Formula 1-15

   Formula 1-16

   Formula 1-17

   Formula 1-18

In Formulae 1-10 through 1-18, $0<x<1$, $0<y1<1$, $0<y2<1$, and $x+y1+y2=1$. In some embodiments, in Formulae 1-10 to 1-18, x and $y1+y2$ may be about 0.20 to about 0.999 and about 0.001 to about 0.80, respectively. For example, in some embodiments, x and $y1+y2$ may be about 0.20 to about 0.99 and about 0.01 to about 0.80, respectively. In some embodiments, x and $y1+y2$ may be about 0.80 to about 0.99 and about 0.01 to about 0.20, respectively. Within these ranges, the window film can have good hardness and flexibility.

The siloxane resin represented by Formula 1 may have a weight average molecular weight of about 4,000 to about 100,000, for example about 4,500 to about 10,000, about 5,000 to about 8,000, or about 5,000 to about 7,000. Within these ranges, the siloxane resin can be easily prepared and provide good hardness and flexibility to the window film.

The siloxane resin represented by Formula 1 may have a polydispersity index (PDI) of about 1.0 to about 3.0, for example about 1.5 to about 2.5. Within these ranges, the composition for a window film can exhibit good coatability and stable coating properties.

The siloxane resin represented by Formula 1 may have an epoxy equivalent of about 0.1 mol/100 g to about 1.0 mol/100 g, for example about 0.3 mol/100 g to about 0.7 mol/100 g. Within these ranges, the window film can exhibit stable coating properties.

The initiator can cure the crosslinkable functional group of the siloxane resin represented by Formula 1. The initiator may include at least one of a cationic photo initiator and/or a radical photo initiator. A single one of these initiators may be used alone, or a combination thereof may be used.

The cationic photo initiator may be any suitable cationic photo initiator, including those known to those skilled in the art. For example, the cationic photo initiator may include an onium salt including a cation and an anion. The cation may include: a diaryliodonium, such as diphenyliodonium, 4-methoxydiphenyliodonium, bis(4-methylphenyl)iodonium, bis(4-tert-butylphenyl)iodonium, bis(dodecylphenyl)iodonium, and/or (4-methylphenyl)[(4-(2-methylpropyl)phenyl)iodonium; a triarylsulfonium, such as triphenylsulfonium, and/or diphenyl-4-thiophenoxyphenylsulfonium; bis[4-(diphenylsulfonio)phenyl]sulfide; and/or the like. In some embodiments, the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), and/or the like.

The radical photo initiator may be any suitable radical photo initiator, including those known to those skilled in the art. For example, the radical photo initiator may include at least one of thioxanthone, phosphorus, triazine, acetophenone, benzophenone, benzoin, and/or an oxime radical photo initiator.

The initiator may be present in an amount of about 0.01 parts by weight to about 20 parts by weight, for example about 1 part by weight to about 10 parts by weight, based on 100 parts by weight of the siloxane resin represented by Formula 1. Within these ranges, the siloxane resin can be sufficiently cured, and deteriorations in the transparency of the window film due to residual initiator can be prevented or reduced.

The composition for a window film according to the embodiment may further include nanoparticles. The nanoparticles can further improve the hardness of the window film. The nanoparticles may include at least one of silica, aluminum oxide, zirconium oxide, and/or titanium oxide, but the nanoparticles are not limited thereto. The nanoparticles may be surface-treated with a silicone compound to improve miscibility with the siloxane resin. The nanoparticles may have any shape and size without limitation. For example, the nanoparticles may include particles having circular, flake, amorphous shapes, or the like. The nanoparticles may have an average particle diameter of about 1 nm to about 200 nm, or about 10 nm to about 50 nm. Within these ranges, the nanoparticles can improve the hardness of the window film without adversely affecting the surface roughness and transparency of the window film. The nanoparticles may be present in an amount of about 0.1 parts by weight to about 60 parts by weight, for example about 10 parts by weight to about 50 parts by weight, based on 100 parts by weight of the siloxane resin represented by Formula 1. Within these ranges, the nanoparticles can improve the hardness of the window film without adversely affecting the surface roughness and transparency of the window film.

The composition for a window film according to embodiments may further include an additive. The additive may provide an additional function to the window film. The additive may include any suitable additive, including those know to those skilled in the art. For example, the additive may be selected from UV absorbers, reaction inhibitors, adhesion promoters, thixotropic agents, conductivity imparting agents, color regulators, stabilizers, antistatic agents, antioxidants, and/or leveling agents, but the additive is not limited thereto. The reaction inhibitors may include ethynylcyclohexane, the adhesion promoters may include epoxy or alkoxysilyl group-containing silane compounds, and the thixotropic agents may include fumed silica and/or the like. The conductivity imparting agents may include powders of metals such as silver, copper, aluminum and/or the like, and the color regulators may include pigments, dyes and/or the like.

The UV absorbers can improve the light resistance of the window film. The UV absorbers may include any suitable UV absorbers, including those known to those skilled in the art. For example, the UV absorbers may be selected from triazine, benzimidazole, benzophenone, benzotriazole, and/or hydroxyphenyltriazine UV absorbers, but the UV absorbers are not limited thereto.

The additive may be present in an amount of about 0.01 parts by weight to about 5 parts by weight, for example about 0.1 parts by weight to about 2.5 parts by weight, based on 100 parts by weight of the siloxane resin represented by Formula 1. Within these ranges, the additive can provide good hardness and flexibility to the window film while also realizing the advantageous effects of the additive.

The composition for a window film according to embodiments may further include a solvent for facilitating the coating or processing of the composition. The solvent may include methylethylketone, methylisobutylketone, and/or propylene glycol monomethyl ether acetate, but is not limited thereto.

The composition for a window film according to embodiments may have a viscosity at 25° C. of about 50 cP to about 2000 cP. Within this range, the composition can facilitate formation of the window film.

According to embodiments of the present invention, a method of preparing the siloxane resin represented by Formula 1 may include the hydrolysis and condensation of a monomer mixture including a first silicone monomer and a second silicone monomer. The first silicone monomer may be present in the monomer mixture in an amount of about 20 mol % to about 99.9 mol %, for example about 20 mol % to about 99 mol %, or about 80 mol % to about 99 mol %. Within these ranges, the first silicone monomer can improve the hardness and flexibility of the window film. The second silicone monomer may be present in the monomer mixture in an amount of about 0.1 mol % to about 80 mol %, for example about 1 mol % to about 80 mol %, or about 1 mol % to about 20 mol %. Within these ranges, the second silicone monomer can improve the hardness and flexibility of the window film.

The first silicone monomer may be a silane compound represented by Formula 2. The second silicone monomer may be a silane compound represented by Formula 3. A single one of these silane compounds may be used alone, or a combination thereof may be used.

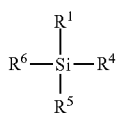

Formula 2

In Formula 2, $R^1$ is as defined above in connection with Formula 1, and $R^4$, $R^5$ and $R^6$ are each independently a halogen, a hydroxyl group or a $C_1$ to $C_{10}$ alkoxy group.

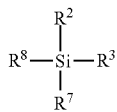

Formula 3

In Formula 3, $R^2$ and $R^3$ are as defined above in connection with Formula 1, and $R^7$ and $R^8$ are each independently a halogen, a hydroxyl group or a $C_1$ to $C_{10}$ alkoxy group.

In some embodiments, the first silicone monomer may include at least one of 2-(3,4-epoxycyclohexyl)ethyltriethoxysilane, 2-(3,4-epoxycyclohexyl)ethyltrimethoxysilane, 3-glycidoxypropyltriethoxysilane, 3-oxetanylmethyltrimethoxysilane, 3-oxetanylethyltrimethoxysilane, 3-oxetanylpropyltrimethoxysilane, and/or 3-oxetanyloxytrimethoxysilane, but the first silicone monomer is not limited thereto.

In some embodiments, the second silicone monomer may include at least one of 2-(3,4-epoxycyclohexyl)ethylmethyldiethoxysilane, dimethyldimethoxysilane, and/or (3-glycidoxypropyl)methyldiethoxysilane, but the second silicone monomer is not limited thereto.

Hydrolysis and condensation of the monomer mixture may be performed according any suitable method for preparing a siloxane resin. Hydrolysis of the monomer mixture may include mixing the first silicone monomer with the second silicone monomer, followed by reacting the silicone monomers in a mixture of water and at least one of an acid and/or a base. For example, the acid may include a strong acid, for example HCl or $HNO_3$, and the base may include a strong base, for example NaOH, KOH or the like. Hydrolysis of the monomer mixture may be performed at about 20° C. to about 100° C. for about 10 minutes to about 7 hours. These conditions can improve the efficiency of hydrolysis of the first silicone monomer and the second silicone monomer. Condensation of the monomer mixture may be performed at about 20° C. to about 100° C. for about 10 minutes to about 12 hours under the same conditions as the hydrolysis of the monomer mixture. These conditions can improve the efficiency of condensation of the first silicone monomer and the second silicone monomer. A platinum catalyst may further be used to improve the efficiency of hydrolysis and condensation of the monomer mixture. The platinum catalyst may be selected from vinylalkylsilane platinum complexes including Karstedt catalysts, platinum black, chloroplatinic acid, chloroplatinic acid-olefin complexes, chloroplatinic acid-alcohol complexes, and mixtures thereof.

According to some embodiments, a composition for a window film may include a siloxane resin represented by Formula 1, an initiator, and a crosslinking agent. The composition for a window film may further include the crosslinking agent to improve the degree of crosslinking of the window film, thereby improving the hardness of the window film. This composition for a window film is substantially the same as the composition described above except that this composition further includes the crosslinking agent. Therefore, the crosslinking agent will now be described.

The crosslinking agent contains a crosslinkable functional group, thereby further improving the hardness of the window film. In addition, the proportion of $(R^2R^3SiO_{2/2})$ in Formula 1 may be increased to improve the flexibility of the window film. The crosslinking agent may further include at least one of a non-cyclic aliphatic hydrocarbon, a cyclic aliphatic hydrocarbon, an aromatic hydrocarbon, a hydrogenated aromatic hydrocarbon, and/or an oxetane group, thereby further improving the flexibility of the window film.

For example, the crosslinking agent may be selected from non-cyclic aliphatic epoxy monomers, cyclic aliphatic epoxy monomers, aromatic epoxy monomers, hydrogenated aromatic epoxy monomers, oxetane monomers, and combinations thereof. A single crosslinking agent may be used alone, or a combination thereof may be used. The cyclic aliphatic epoxy monomer can further improve the hardness, flexibility and optical reliability of the window film (including the siloxane resin represented by Formula 1 and a polyester film (such as a polyimide film or a polyethylene terephthalate film) as the base film).

The non-cyclic aliphatic epoxy monomer may include: 1,4-butanediol diglycidyl ether, 1,6-hexanediol diglycidyl ether, neopentylglycol diglycidyl ether, trimethylolpropanetriglycidyl ether, polyethyleneglycol diglycidyl ether, glycerin triglycidyl ether, polypropylene glycol diglycidyl ether; polyglycidyl ethers of polyether polyols obtained by adding at least one alkylene oxide to an aliphatic polyhydric alcohol such as ethylene glycol, propylene glycol, and/or glycerine; diglycidyl esters of aliphatic long-chain dibasic acids; monoglycidyl ethers of aliphatic higher alcohols; glycidyl ethers of higher fatty acids; epoxidized soybean oil; butyl epoxystearate; octyl epoxy stearate; epoxidized linseed oil; epoxidized polybutadiene; and/or the like.

The cyclic aliphatic epoxy monomer is a compound in which an alicyclic group has at least one epoxy group, and may include alicyclic epoxy carboxylate, alicyclic epoxy (meth)acrylate, and/or the like. Nonlimiting examples of the cyclic aliphatic epoxy monomer may include (3,4-epoxycyclohexyl)methyl-3',4'-epoxycyclohexanecarboxylate, diglycidyl 1,2-cyclohexanedicarboxylate, epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexylmethyl-3',4'-epoxy-6'-methylcyclohexanecarboxylate, 6-caprolactone-modified 3,4-epoxycyclohexylmethyl-3',4'-epoxy-cyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, 1,4-cyclohexanedimethanol bis(3,4-epoxycyclohexane)carboxylate, ethylene glycol di(3,4-epoxycyclohexylmethyl)ether, ethylenebis(3,4-epoxycyclohexanecarboxylate), 3,4-epoxycyclohexylmethyl (meth)acrylate, 4-vinylcyclohexenedioxide, vinylcyclohexenemonoxide, and the like.

The aromatic epoxy monomer may be selected from: bisphenol epoxy resins such as bisphenol A diglycidyl ether, bisphenol F diglycidyl ether, and bisphenol S diglycidyl ether; novolac epoxy resins such as phenol novolac epoxy resins, cresol novolac epoxy resins, and hydroxybenzaldehydephenol novolac epoxy resins; polyfunctional epoxy resins such as tetrahydroxyphenylmethaneglycidyl ether, tetrahydroxybenzophenoneglycidyl ether, and epoxidized polyvinyl phenol, and the like.

The hydrogenated aromatic epoxy monomer refers to a monomer obtained through selective hydrogenation of an aromatic epoxy monomer in the presence of a catalyst under pressure. The aromatic epoxy monomer for the hydrogenated aromatic epoxy monomer may include the aromatic epoxy monomers set forth above.

Nonlimiting examples of the oxetane monomer may include 3-methyloxetane, 2-methyloxetane, 2-ethylhexyloxetane, 3-oxetanol, 2-methyleneoxetane, 3,3-oxetanedimethanethiol, 4-(3-methyloxetan-3-yl)benzonitrile, N-(2,2-dimethylpropyl)-3-methyl-3-oxetane methaneamine, N-(1,2-dimethylbutyl)-3-methyl-3-oxetane methaneamine, (3-ethyloxetan-3-yl)methyl(meth)acrylate, 4[(3-ethyloxetan-3-yl)methoxy]butan-1-ol, 3-ethyl-3-hydroxymethyloxetane, xylenebis-oxetane, and 3-[ethyl-3[[(3-ethyloxetane-3-yl]methoxy]methyl]oxetane.

The crosslinking agent may be present in an amount of about 0.1 parts by weight to about 50 parts by weight, for example about 1 part by weight to about 30 parts by weight, or about 5 parts by weight to about 15 parts by weight, based on 100 parts by weight of the siloxane resin represented by Formula 1. Within these ranges, the crosslinking agent can improve the flexibility and hardness of the window film.

The composition for a window film according to embodiments may also further include at least one of the nanoparticles and the additive, which are set forth above.

A flexible window film according to embodiments of the present invention is depicted in FIG. 1. FIG. 1 is a schematic cross-sectional view of a flexible window film according to embodiments of the present invention. Referring to FIG. 1, a flexible window film 100 according to embodiments of the present invention may include a base layer 110 and a coating layer 120, and the coating layer 120 may be formed of the composition for a window film according to embodiments of the present invention.

The base layer 110 supports the flexible window film 100 and the coating layer 120, thereby improving the mechanical strength of the flexible window film 100. The base layer 110 may be attached to a display unit, a touchscreen panel, or a polarizing plate via an adhesive layer or the like.

The base layer 110 may be formed of an optically transparent flexible resin. For example, the resin may be selected from polyester resins such as polyethylene terephthalate, polyethylene naphthalate, polybutylene terephthalate, and polybutylene naphthalate; polycarbonate resins; polyimide resins; polystyrene resins; and poly(meth)acrylate resins such as polymethyl methacrylate. A single one of these resins may be used alone, or a combination thereof may be used. The base layer 110 may have a thickness of about 10 µm to about 200 µm, for example about 20 µm to about 150 µm, or about 50 µm to about 100 µm. Within these ranges, the base layer 110 can be used for a flexible window film.

The coating layer 120 is formed on the base layer 110 to protect the base layer 110 and a display unit, a touchscreen panel or a polarizing plate, and can be used in flexible displays due to its high flexibility and high hardness. The coating layer 120 may have a thickness of about 5 µm to about 100 µm, for example about 10 µm to about 80 µm. Within these ranges, the coating layer 120 can be used in flexible window films.

Although not shown in FIG. 1, a functional layer, such as an antireflective layer, an anti-glare layer, and/or a hard coating layer, may be further formed on the other surface of the coating layer 120 to provide an additional function to the flexible window film. In addition, although not shown in FIG. 1, the coating layer 120 may be further formed on the other surface of the base layer 110.

The flexible window film 100 is optically transparent and can be used in transparent displays. In some embodiments, the flexible window film 100 may have a transmittance of about 88% or higher, for example about 88% to about 100%, in the visible light region, for example at a wavelength of about 400 nm to about 800 nm. Within these ranges, the flexible window film 100 can be used as a flexible window film.

The flexible window film 100 may have a pencil hardness of about 7H or higher, a radius of curvature of about 5.0 mm or less, and $\Delta Y.I.$ of about 5.0 or less. Within these ranges, the flexible window film 100 can be used as a flexible window film due to its good hardness, flexibility and light resistance. For example, the flexible window film 100 may have a pencil hardness of about 7H to about 9H, a radius of curvature of about 0.1 mm to about 5.0 mm, and $\Delta Y.I.$ of about 0.1 to about 5.0.

The flexible window film 100 may have a thickness of about 50 µm to about 300 µm. Within this range, the flexible window film 100 can be used as a flexible window film.

The flexible window film 100 may be manufactured by a method that includes coating the composition for a window film according to embodiments of the present invention onto the base layer 110, followed by curing the composition.

The method of coating the composition for a window film onto the base layer 110 is not particularly limited. For example, the coating method may include bar coating, spin coating, dip coating, roll coating, flow coating, die coating, or the like. The composition for a window film may be coated onto the base layer 110 to a thickness of about 5 µm to about 100 µm. Within this range, a desired coating layer can be obtained, and the coating layer has good hardness, flexibility and reliability.

Curing allows the composition for a window film to be cured to form the coating layer, and may include at least one of photocuring and/or thermal curing. Photocuring may include irradiating the composition with light at a wavelength of about 400 nm or lower at a dose of about 10 mJ/cm$^2$ to about 1000 mJ/cm$^2$. Thermal curing may include treating the composition at about 40° C. to about 200° C. for about 1 hour to about 30 hours. Within these ranges, the composition for a window film can be sufficiently cured. For example, the composition may be subjected to photocuring, followed by thermal curing, thereby further improving the hardness of the coating layer.

After the composition is coated onto the base layer 110 and before the composition is cured, the method of manufacturing a flexible window film may further include drying the composition for a window film. The composition may be dried, followed by curing, thereby preventing (or reducing) increases in the surface roughness of the coating layer due to photocuring or thermal curing for a long period of time. Drying may be performed at about 40° C. to about 200° C. for about 1 minute to about 30 hours, but is not limited thereto.

Figure 2:
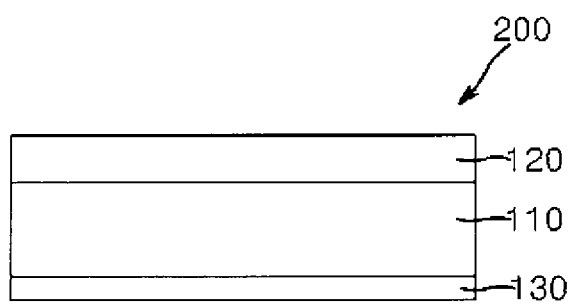
FIG. 2 is a schematic cross-sectional view of a flexible window film according to embodiments of the present invention.

A flexible window film according to embodiments of the present invention is depicted in FIG. 2. FIG. 2 is a schematic cross-sectional view of a flexible window film according to embodiments of the present invention. Referring to FIG. 2, a flexible window film 200 according to embodiments of the present invention may include a base layer 110, a coating layer 120 formed on one surface of the base layer 110, and an adhesive layer 130 formed on the other surface of the base layer 110. The coating layer 120 may be formed of the composition for a window film according to embodiments of the present invention. The adhesive layer 130 is formed on the other surface of the base layer 110, thereby facilitating bonding between the flexible window film and a touchscreen panel, a polarizing plate or a display unit. This flexible window film 200 is substantially the same as the flexible window film 100 described above in connection with FIG. 1 except that the flexible window film 200 further includes the adhesive layer. Thus, the adhesive layer will now be described.

The adhesive layer 130 bonds a polarizing plate, a touchscreen panel or a display unit (which may be disposed on a lower side of the flexible window film 200) to the flexible window film 200, and may be formed of a composition for adhesive layers. For example, the adhesive layer 130 may be formed of a composition for adhesive layers, which includes an adhesive resin (such as a (meth)acrylic resin, a urethane resin, a silicone resin and/or an epoxy resin), a curing agent, a photoinitiator, and a silane coupling agent.

The (meth)acrylic resin may be a (meth)acrylic copolymer having an alkyl group, a hydroxyl group, an aromatic group, a carboxylic acid group, an alicyclic group, a heteroalicyclic group, and/or the like, and may include any suitable (meth)acrylic copolymer(s). For example, the (meth)acrylic resin may be formed of a monomer mixture including at least one of a (meth)acrylic monomer containing a $C_1$ to $C_{10}$ unsubstituted alkyl group, a $C_1$ to $C_{10}$ alkyl group-containing (meth)acrylic monomer having at least one hydroxyl group, a $C_6$ to $C_{20}$ aromatic group-containing (meth)acrylic monomer, a carboxylic acid group-containing (meth)acrylic monomer, a $C_3$ to $C_{20}$ alicyclic group-containing (meth)acrylic monomer, and/or a $C_3$ to $C_{10}$ heteroalicyclic group-containing (meth)acrylic monomer having at least one of nitrogen (N), oxygen (O) and sulfur (S).

The curing agent may be a polyfunctional (meth)acrylate, and may be selected from bifunctional (meth)acrylates such as hexanediol diacrylate; trifunctional (meth)acrylates such as trimethylolpropane tri(meth)acrylate; tetrafunctional (meth)acrylates such as pentaerythritol tetra(meth)acrylate; pentafunctional (meth)acrylates such as dipentaerythritol penta(meth)acrylate; and hexafunctional (meth)acrylates such as dipentaerythritol hexa(meth)acrylate, but the curing agent is not limited thereto.

The photoinitiator may be any suitable photoinitiator, and may include the photo-radical initiators as set forth above.

The silane coupling agent may include an epoxy group-containing silane coupling agent such as 3-glycidoxypropyltrimethoxysilane.

The composition for adhesive layers may include 100 parts by weight of the (meth)acrylic resin, about 0.1 parts by weight to about 30 parts by weight of the curing agent, about 0.1 parts by weight to about 10 parts by weight of the photoinitiator, and about 0.1 parts by weight to about 20 parts by weight of the silane coupling agent. Within these ranges, the adhesive layer 130 allows the flexible window film to be efficiently bonded to the display unit, touchscreen panel, or polarizing plate.

The adhesive layer 130 may have a thickness of about 10 μm to about 100 μm. Within this range, the adhesive layer 130 allows the flexible window film to be sufficiently bonded to an optical device, such as a polarizing plate or the like.

Figure 3:
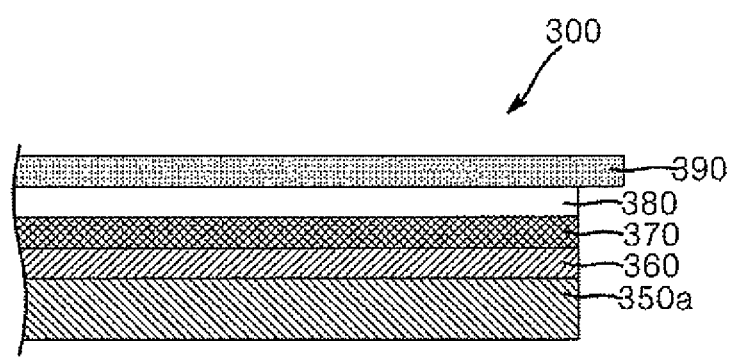
FIG. 3 is a partial cross-sectional view of a flexible display according to embodiments of the present invention.
Figure 4:
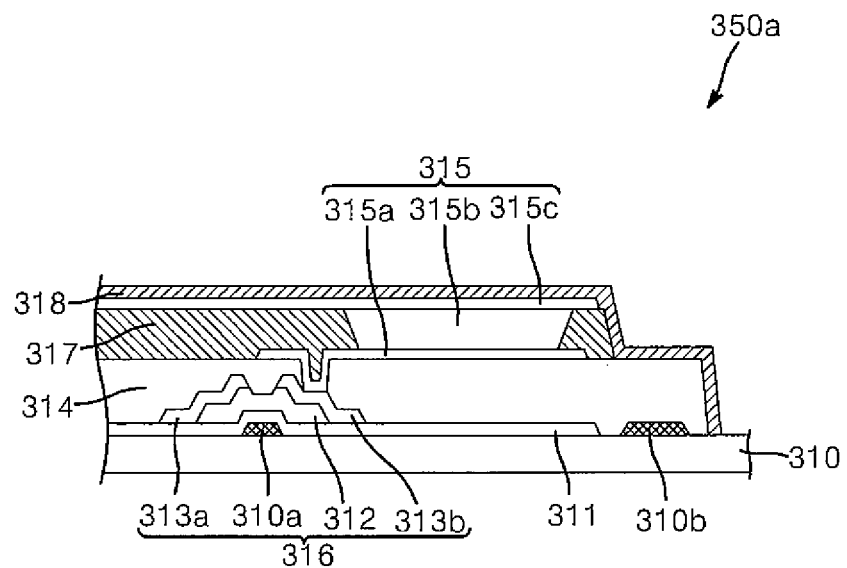
FIG. 4 is a partial cross-sectional view of a display unit (according to embodiments of the present invention) of the flexible display of FIG. 3.

A flexible display according to embodiments of the present invention is depicted in FIGS. 3 and 4. FIG. 3 is a partial cross-sectional view of a flexible display according embodiments of the present invention, and FIG. 4 is a partial cross-sectional view of embodiments of a display unit of the flexible display of FIG. 3. Referring to FIG. 3, a flexible display 300 according to embodiments may include a display unit 350a, an adhesive layer 360, a polarizing plate 370, a touchscreen panel 380, and a flexible window film 390. The flexible window film 390 may include the flexible window film according to embodiments of the present invention.

The display unit 350a drives the flexible display 300 and may include a board and an optical device, such as an OLED, LED or LCD device, which is formed on the board. FIG. 4 is a partial cross-sectional view of embodiments of the display unit of the flexible display of FIG. 3. Referring to FIG. 4, the display unit 350a may include a lower board 310, a thin film transistor 316, an organic light emitting diode 315, a planarization layer 314, a protective film 318, and an insulating film 317.

The lower board 310 supports the display unit 350a, and the thin film transistor 316 and the organic light emitting diode 315 may be formed on the lower board 310. A flexible printed circuit board (FPCB) for driving the touchscreen panel 380 may be formed on the lower board 310. A timing controller, a power supply and the like for driving the organic light emitting diode may be further formed on the flexible printed circuit board.

The lower board 310 may include a board formed of a flexible resin. For example, the lower board 310 may include a silicone board, a polyimide board, a polycarbonate board, or a polyacrylate board, but the lower board 310 is not limited thereto.

In the display region of the lower board 310, a plurality of pixel regions may be defined by intersecting a plurality of driving wires (not shown) with a plurality of sensor wires (not shown), and an organic light emitting diode array including the thin film transistor 316 and the organic light emitting diode 315 connected to the thin film transistor 316 may be formed in each of the pixel regions. In the non-display region of the lower board 310, a gate driver for applying an electrical signal to the driving wires may be formed in a gate-in-panel form. A gate-in-panel circuit may be formed at one or both sides of the display region.

The thin film transistor 316 controls electric current, which flows through a semiconductor upon application of an electric field perpendicular to the current to the semiconductor, and may be formed on the lower board 310. The thin film transistor 316 may include a gate electrode 310a, a gate insulating film 311, a semiconductor layer 312, a source electrode 313a, and a drain electrode 313b. The thin film transistor 316 may be an oxide thin film transistor including an oxide (such as indium gallium zinc oxide (IGZO), ZnO, and/or TiO) as the semiconductor layer 312, an organic thin film transistor including an organic material as the semiconductor layer, an amorphous silicon thin film transistor including amorphous silicon as the semiconductor layer, or a polycrystalline silicon thin film transistor including polycrystalline silicon as the semiconductor layer.

The planarization layer 314 covers the thin film transistor 316 and a circuit 310b to flatten the upper sides of the thin film transistor 316 and the circuit 310b, thereby allowing the organic light emitting diode 315 to be formed. The planarization layer 314 may be formed of a spin-on-glass (SOG) film, a polyimide polymer, or a polyacrylic polymer, but is not limited thereto.

The organic light emitting diode 315 emits light to display an image, and may include a first electrode 315a, an organic light emitting layer 315b and a second electrode 315c, which are sequentially stacked, one above the other. Adjoining organic light emitting diodes may be separated from each other by the insulating film 317. The organic light emitting diode 315 may include a back side light emitting structure in which light generated in the organic light emitting layer 315b is emitted through the lower board, or a front side light emitting structure in which light generated in the organic light emitting layer 315b is emitted through the upper board.

The protective film 318 covers the organic light emitting diode 315 to protect the organic light emitting diode 315. The protective film 318 may be formed of an inorganic material (such as SiOx, SiNx, SiC, SiON, SiONC and amorphous carbon (a-C)), and an organic material (such as (meth)acrylates, epoxy polymers, and imide polymers). For example, the protective film 318 may include an encapsulation layer in which a layer formed of an inorganic material and a layer formed of an organic material are alternately stacked to form one or more dyads.

Referring again to FIG. 3, the display unit 350a is bonded to the polarizing plate 370 via the adhesive layer 360. The adhesive layer 360 may be formed of an adhesive composition including a (meth)acrylate resin, a curing agent, an initiator and a silane coupling agent.

The polarizing plate 370 polarizes internal light or prevents reflection of external light, thereby displaying an image or improving contrast of the displayed image. The polarizing plate may include a polarizer alone. Alternatively, the polarizing plate may include a polarizer and a protective film formed on one or both surfaces of the polarizer. Alternatively, the polarizing plate may include a polarizer and a protective coating layer formed on one or both surfaces of the polarizer. The polarizer, the protective film and the protective coating layer may be any suitable polarizer, suitable protective film and suitable protective coating layer known to those skilled in the art.

The touchscreen panel 380 generates an electrical signal by sensing changes in capacitance generated when a human body or a conductor such as a stylus touches the touchscreen panel, and the display unit 350a may be driven by the signal. The touchscreen panel 380 is formed by patterning a flexible conductor, and may include first sensor electrodes, and second sensor electrodes each formed between the first sensor electrodes and intersecting the first sensor electrodes. The conductor for the touchscreen panel 380 may include metal nanowires, conductive polymers, and/or carbon nanotubes, but is not limited thereto.

The flexible window film 390 may be formed at an outermost side of the flexible display 300 to protect the display.

Although not shown in FIG. 3, an adhesive layer may be further formed between the polarizing plate 370 and the touchscreen panel 380 and/or between the touchscreen panel 380 and the flexible window film 390, thereby reinforcing bonding between the polarizing plate, the touchscreen panel, and the flexible window film. The adhesive layer may be formed of an adhesive composition including a (meth)acrylate resin, a curing agent, an initiator, and a silane coupling agent. Although not shown in FIG. 3, a polarizing plate may be further formed on a lower side of the display unit 350a, thereby enabling polarization of internal light.

Figure 5:
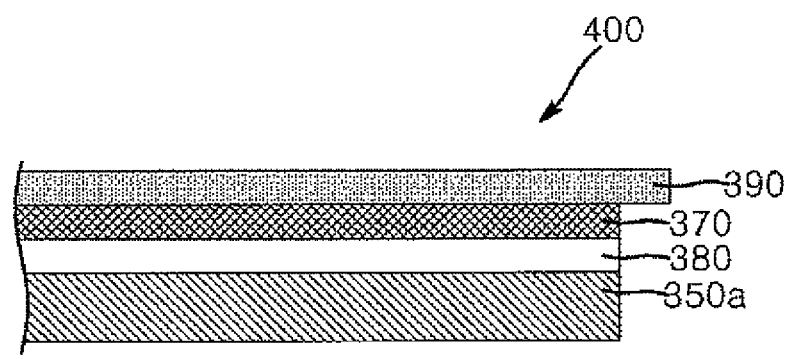
FIG. 5 is a partial cross-sectional view of a flexible display according to embodiments of the present invention.

A flexible display according to embodiments of the present invention is depicted in FIG. 5. FIG. 5 is a partial cross-sectional view of a flexible display according to embodiments of the present invention. Referring to FIG. 5, a flexible display 400 according to embodiments of the present invention may include a display unit 350a, a touchscreen panel 380, a polarizing plate 370, and a flexible window film 390. The flexible window film 390 may include the flexible window film according to embodiments of the present invention. The flexible display 400 depicted in FIG. 5 is substantially the same as the flexible displays described above except that the touchscreen panel 380 is not formed directly on the flexible window film 390, and is formed on a lower side of the polarizing plate 370. Here, the touchscreen panel 380 may be formed together with the display unit 350a. In this case, the touchscreen panel 380 is formed integrally with the display unit 350a, enabling the flexible display 400 to have a thinner thickness and higher brightness, and thus better visibility than the flexible displays described above. In addition, the touchscreen panel 380 may be formed by deposition, although it is not limited thereto. Although not shown in FIG. 5, an adhesive layer may be further formed between the display unit 350a and the touchscreen panel 380, between the touchscreen panel 380 and the polarizing plate 370, and/or between the polarizing plate 370 and the flexible window film 390, thereby improving the mechanical strength of the display. The adhesive layer may be formed of an adhesive composition including a (meth)acrylate resin, a curing agent, an initiator, and a silane coupling agent. Although not shown in FIG. 5, a polarizing plate may be further formed on a lower side of the display unit 350a, thereby improving the displayed image by polarizing internal light.

Figure 6:
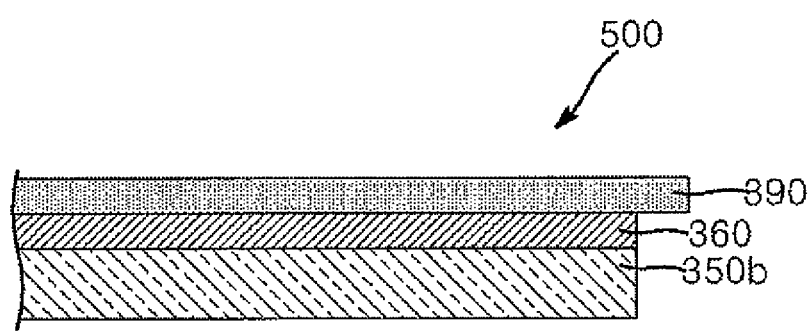
FIG. 6 is a partial cross-sectional view of a flexible display according to embodiments of the present invention.

A flexible display according to embodiments of the present invention is depicted in FIG. 6. FIG. 6 is a partial cross-sectional view of a flexible display according to embodiments of the present invention. Referring to FIG. 6, a flexible display 500 according to embodiments of the present invention may include a display unit 350b, an adhesive layer 360, and a flexible window film 390. The flexible window film 390 may include the flexible window film according to embodiments of the present invention. The flexible display 500 is substantially the same as the flexible displays described above except that the display can be driven only by the display unit 350b, and the polarizing plate and touchscreen panel are omitted.

The display unit 350b may include a board and an optical device (such as an LCD, OLED or LED device) formed on the board. In addition, the display unit 350b may include a touchscreen panel therein.

Next, embodiments of the present invention will be described with reference to some examples. It is understood, however, that these examples are provided for illustration only and are not to be construed in any way as limiting the embodiments of the present invention.

Example 1

50 g of a monomer mixture including 95 mol % of 2-(3,4-epoxycyclohexyl)ethyltriethoxysilane (Sigma-Aldrich Co., Ltd.) and 5 mol % of 2-(3,4-epoxycyclohexyl) ethylmethyldiethoxysilane (Gelest Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by gel permeation chromatography (GPC): 6200) was prepared by removing residual water and alcohol using a vacuum distillation apparatus, followed by adding methylethylketone to the mixture, thereby adjusting the amount of the siloxane resin to 90% by weight (wt %) in terms of solids content.

100 parts by weight of the prepared siloxane resin, 5 parts by weight of Irgacure-250 (BASF Co., Ltd.) as an initiator, and 1 part by weight of Tinuvin 479 (BASF Co., Ltd.) as a UV absorber were mixed, thereby preparing a composition for a window film. The prepared composition was coated onto a polyethylene terephthalate film (TA043, Toyobo Co., Ltd., thickness: 80 μm), followed by drying at 100° C. for 5 minutes. Next, the composition was subjected to UV irradiation at a dose of 1000 mJ/cm², followed by heating at 80° C. for 4 hours, thereby manufacturing a window film including a 50 µm thick coating layer.

Example 2

50 g of a monomer mixture including 95 mol % of 2-(3,4-epoxycyclohexyl)ethyltriethoxysilane (Sigma-Aldrich Co., Ltd.) and 5 mol % of 2-(3,4-epoxycyclohexyl) ethylmethyldiethoxysilane (Gelest Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content.

100 parts by weight of the prepared siloxane resin, 10 parts by weight of CY-179 (CIBA Co., Ltd.) as a crosslinking agent, 5 parts by weight of Irgacure-250 (BASF Co., Ltd.) as an initiator, and 1 part by weight of Tinuvin 479 (BASF Co., Ltd.) as a UV absorber were mixed, thereby preparing a composition for a window film. The prepared composition was coated onto a polyethylene terephthalate film (TA043, Toyobo Co., Ltd., thickness: 80 µm), followed by drying at 100° C. for 5 minutes. Next, the composition was subjected to UV irradiation at a dose of 1000 mJ/cm², followed by heating at 80° C. for 4 hours, thereby manufacturing a window film including a 50 µm thick coating layer.

Example 3

50 g of a monomer mixture including 90 mol % of 2-(3,4-epoxycyclohexyl)ethyltriethoxysilane (Sigma-Aldrich Co., Ltd.) and 10 mol % of 2-(3,4-epoxycyclohexyl) ethylmethyldiethoxysilane (Gelest Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Example 4

50 g of a monomer mixture including 95 mol % of 2-(3,4-epoxycyclohexyl)ethyltriethoxysilane (Sigma-Aldrich Co., Ltd.) and 5 mol % of dimethyldimethoxysilane (Sigma-Aldrich Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Example 5

50 g of a monomer mixture including 90 mol % of 2-(3,4-epoxycyclohexyl)ethyltriethoxysilane (Sigma-Aldrich Co., Ltd.) and 10 mol % of dimethyldimethoxysilane (Sigma-Aldrich Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Example 6

50 g of a monomer mixture including 90 mol % of 2-(3,4-epoxycyclohexyl)ethyltriethoxysilane (Sigma-Aldrich Co., Ltd.), 5 mol % of 2-(3,4-epoxycyclohexyl)ethylmethyldiethoxysilane (Gelest Co., Ltd.) and 5 mol % of dimethyldimethoxysilane (Sigma-Aldrich Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Example 7

A window film was manufactured as in Example 4, except that 10 parts by weight of diglycidyl 1,2-cyclohexanedicarboxylate (Sigma-Aldrich Co., Ltd.) was used as the crosslinking agent instead of the 10 parts by weight of CY-179 (CIBA Co., Ltd.).

Comparative Example 1

50 g of a monomer mixture including 100 mol % of 2-(3,4-epoxycyclohexyl)ethyltriethoxysilane (Sigma-Aldrich Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Comparative Example 2

50 g of a monomer mixture including 100 mol % of 3-glycidoxypropyltriethoxysilane (Gelest Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Comparative Example 3

50 g of a monomer mixture including 95 mol % of 2-(3,4-epoxycyclohexyl)ethyltriethoxysilane (Sigma-Aldrich Co., Ltd.) and 5 mol % of phenylmethyldimethoxysilane (Gelest Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solid contents. A window film was manufactured as in Example 2 using the prepared siloxane resin.

Comparative Example 4

50 g of a monomer mixture including 100 mol % of 2-(3,4-epoxycyclohexyl)ethylmethyldiethoxysilane (Sigma-Aldrich Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Comparative Example 5

50 g of a monomer mixture including 95 mol % of methyltrimethoxysilane and 5 mol % of 2-(3,4-epoxycyclohexyl)ethylmethyldiethoxysilane (Sigma-Aldrich Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

Comparative Example 6

50 g of a monomer mixture including 95 mol % of methyltrimethoxysilane and 5 mol % of 2-(3,4-epoxycyclohexyl)ethyltriethoxysilane (Sigma-Aldrich Co., Ltd.) were placed in a 200 ml 2-neck flask. Based on the amount of the monomer mixture, 2 mol % of KOH and 1 mol % of water were added to the monomer mixture, followed by stirring at 65° C. for 4 hours. A siloxane resin (weight average molecular weight measured by GPC: 6200) was prepared by removing residual water and alcohol using a vacuum distillation apparatus, followed by adding methylethylketone to the mixture, thereby adjusting the amount of the siloxane resin to 90 wt % in terms of solids content. A window film was manufactured as in Example 2 using the prepared siloxane resin.

The details of the compositions for a window film referenced in the Examples and Comparative Examples are shown in Tables 1 and 2. The window films manufactured according to the Examples and Comparative Examples were evaluated as to the following properties (1) to (3). The results are shown in Tables 1 and 2.

(1) Pencil hardness: Pencil hardness was measured on the coating layer of the window film using a pencil hardness tester (Heidon Co., Ltd.) in accordance with JIS K5400. A pencil (Mitsubishi Co., Ltd.) having a pencil hardness of 6B to 9H was used. Pencil hardness was measured under a load of 1 kg on the coating layer, a scratching angle of 45°, and a scratching speed of 60 mm/min. When the coating layer had one or more scratches after being tested 5 times using a certain pencil, the pencil hardness was measured again using another pencil having one-level lower hardness than the previous pencil. The maximum pencil hardness value of the pencil that allowed no scratches to be observed after repeating the pencil hardness measurement five times on the coating layer was taken as the pencil hardness of the coating layer.

(2) Radius of curvature: The window film (width×length×thickness: 3 cm×15 cm×130 µm, base layer thickness: 80 µm, coating layer thickness: 50 µm) was wound around a jig for testing radius of curvature, followed by keeping the window film wound for 5 seconds, and then unwinding the film from the jig. Next, the window film was observed by the naked eye as to whether the window film suffered from cracking. Here, the radius of curvature in the compressive direction was measured when the window film was wound around the jig such that the coating layer of the window film contacted the jig. The radius of curvature in the tensile direction was measured when the window film was wound around the jig such that the base layer of the window film contacted the jig. Measurement of the radius of curvature in the compressive direction was performed while the diameter of the jig was gradually decreased from a maximum diameter, and the minimum radius of the jig causing no observable cracks in the window film was recorded as the radius of curvature of the window film.

(3) Light resistance reliability: The yellow index (Y1) of the window film was measured under a D65 light source and a 2° angle between the window film and the light source using a colorimeter (CM3600D, Konica Minolta Co., Ltd.). Then, the window film was irradiated with light having a peak wavelength of 306 nm for 72 hours using a light resistance tester (Xe-1, Q-sun Co., Ltd.), followed by measuring the yellow index (Y2) in the same manner as described above. The light resistance of the window film was determined by the difference in the yellow index before and after light irradiation (i.e., $\Delta Y.I.=Y2-Y1$,).

TABLE 1

|  |  | Example | | | | | | |
|---|---|---|---|---|---|---|---|---|
|  |  | 1 | 2 | 3 | 4 | 5 | 6 | 7 |
| Silicone monomer (mol %) | 2-(3,4-epoxycyclohexyl)ethyltriethoxysilane | 95 | 95 | 90 | 95 | 90 | 90 | 95 |
|  | 2-(3,4-epoxycyclohexyl)ethylmethyldiethoxysilane | 5 | 5 | 10 | — | — | 5 | — |
|  | Dimethyldimethoxysilane | — | — | — | 5 | 10 | 5 | 5 |
|  | Phenylmethyldimethoxysilane | — | — | — | — | — | — | — |
|  | 3-glycidoxypropyltriethoxysilane | — | — | — | — | — | — | — |
|  | Methyltrimethoxysilane | — | — | — | — | — | — | — |
| Crosslinking agent (parts by weight) |  | — | 10 | 10 | 10 | 10 | 10 | 10 |
| Initiator (parts by weight) |  | 5 | 5 | 5 | 5 | 5 | 5 | 5 |
| UV absorber (parts by weight) |  | 1 | 1 | 1 | 1 | 1 | 1 | 1 |
| Pencil hardness |  | 7H | 8H | 7H | 8H | 7H | 7H | 8H |
| Radius of curvature (mm) |  | 3.8 | 3.0 | 2.8 | 3.1 | 2.6 | 2.7 | 3.8 |
| Light resistance reliability |  | 2.5 | 2.8 | 2.6 | 2.4 | 2.3 | 2.5 | 2.2 |

TABLE 2

|  |  | Comparative Example | | | | | |
|---|---|---|---|---|---|---|---|
|  |  | 1 | 2 | 3 | 4 | 5 | 6 |
| Silicone monomer (mol %) | 2-(3,4-epoxycyclohexyl)ethyltriethoxysilane | 100 | — | 95 | — | — | 5 |
|  | 2-(3,4-epoxycyclohexyl)ethylmethyldiethoxysilane | — | — | — | 100 | 5 | — |
|  | Dimethyldimethoxysilane | — | — | — | — | — | — |
|  | Phenylmethyldimethoxysilane | — | — | 5 | — | — | — |
|  | 3-glycidoxypropyltriethoxysilane | — | 100 | — | — | — | — |
|  | Methyltrimethoxysilane | — | — | — | — | 95 | 95 |
| Crosslinking agent (parts by weight) |  | 10 | 10 | 10 | 10 | 10 | 10 |
| Initiator (parts by weight) |  | 5 | 5 | 5 | 5 | 5 | 5 |
| UV absorber (parts by weight) |  | 1 | 1 | 1 | 1 | 1 | 1 |
| Pencil hardness |  | 7H | 6H | 6H | 2H | 3H | 4H |
| Radius of curvature (mm) |  | 5.9 | 4.6 | 6.9 | 2.0 | 7.6 | 8.2 |
| Light resistance reliability |  | 3.8 | 5.2 | 9.7 | 3.5 | 3.9 | 3.9 |

As shown in Table 1, since the window films according to embodiments of the present invention had high hardness (such as a pencil hardness of 7H or higher), good flexibility (such as a radius of curvature of 5.0 mm or less), and good light resistance reliability, the window films according to embodiments of the present invention could be used as flexible window films.

According to embodiments of the present invention, a composition for a window film can be used to make a flexible window film having good hardness and flexibility. According to embodiments of the present invention, a flexible window film has good hardness and flexibility, and a flexible display includes the flexible window film.

However, as shown in Table 2, the window films of Comparative Examples 1 to 6 (including the coating layer which did not include the siloxane resin according to embodiments of the present invention) had poorer pencil hardness, radius of curvature and/or light resistance than the window films according to embodiments of the present invention.

While certain embodiments of the present invention have been illustrated and described, it is understood that various modifications, changes, alterations, and equivalent embodiments can be made by those skilled in the art without departing from the spirit and scope of the invention, as defined in the following claims.

What is claimed is:
1. A composition for a window film, comprising:
a siloxane resin represented by Formula 1;
a crosslinking agent present in the composition in an amount of about 0.1 parts by weight to about 50 parts by weight, based on 100 parts by weight of the siloxane resin, the crosslinking agent being selected from the group consisting of non-cyclic aliphatic epoxy monomers, cyclic aliphatic epoxy monomers, aromatic epoxy monomers, hydrogenated aromatic epoxy monomers, oxetane monomers and combinations thereof; and
an initiator,

$$(R^1SiO_{3/2})_x(R^2R^3SiO_{2/2})_y \quad \text{Formula 1}$$

wherein:
R$^1$ is a crosslinkable functional group selected from the group consisting of:
  a glycidyl group;
  a glycidoxy group;
  an oxetanyl group;
  an oxetanyloxy group;
  a C$_1$ to C$_{20}$ alkyl group substituted with a glycidyl group, a glycidoxy group, an epoxidized C$_5$ to C$_{20}$ cycloalkyl group, an epoxidized C$_1$ to C$_{10}$ linear or branched alkyl group, an oxetanyl group, or an oxetanyloxy group; or
  a C$_5$ to C$_{20}$ cycloalkyl group substituted with a glycidyl group, a glycidoxy group, an epoxidized C$_5$ to C$_{20}$ cycloalkyl group, an epoxidized C$_1$ to C$_{10}$ linear or branched alkyl group, an oxetanyl group, or an oxetanyloxy group;

R² and R³ are each independently hydrogen, a crosslinkable functional group, an unsubstituted or substituted $C_1$ to $C_{20}$ alkyl group, or an unsubstituted or substituted $C_5$ to $C_{20}$ cycloalkyl group;
at least one of R² and R³ is an unsubstituted or substituted $C_1$ to $C_{20}$ alkyl group;
$0.80 \leq x \leq 0.99$;
$0.01 \leq y \leq 0.20$; and
$x+y=1$.

2. The composition according to claim 1, wherein the siloxane resin comprises a compound represented by one of Formulae 1-1 to 1-18:

$$(EcSiO_{3/2})_x(EcMeSiO_{2/2})_y \quad \text{Formula 1-1}$$

$$(EcSiO_{3/2})_x((Me)_2SiO_{2/2})_y \quad \text{Formula 1-2}$$

$$(EcSiO_{3/2})_x(GpMeSiO_{2/2})_y \quad \text{Formula 1-3}$$

$$(GpSiO_{3/2})_x(EcMeSiO_{2/2})_y \quad \text{Formula 1-4}$$

$$(GpSiO_{3/2})_x((Me)_2SiO_{2/2})_y \quad \text{Formula 1-5}$$

$$(GpSiO_{3/2})_x(GpMeSiO_{2/2})_y \quad \text{Formula 1-6}$$

$$(OpSiO_{3/2})_x(EcMeSiO_{2/2})_y \quad \text{Formula 1-7}$$

$$(OpSiO_{3/2})_x((Me)_2SiO_{2/2})_y \quad \text{Formula 1-8}$$

$$(OpSiO_{3/2})_x(GpMeSiO_{2/2})_y \quad \text{Formula 1-9}$$

wherein, in Formulae 1-1 through 1-9, Ec is a (3,4-epoxycyclohexyl)ethyl group; Me is a methyl group; Gp is a 3-glycidoxypropyl group; Op is a 3-oxetanylpropyl group; $0.80 \leq x \leq 0.99$; $0.01 \leq y \leq 0.20$; and $x+y=1$;

$$(EcSiO_{3/2})_x(EcMeSiO_{2/2})_{y1}((Me)_2SiO_{2/2})_{y2} \quad \text{Formula 1-10}$$

$$(GpSiO_{3/2})_x(EcMeSiO_{2/2})_{y1}((Me)_2SiO_{2/2})_{y2} \quad \text{Formula 1-11}$$

$$(OpSiO_{3/2})_x(EcMeSiO_{2/2})_{y1}((Me)_2SiO_{2/2})_{y2} \quad \text{Formula 1-12}$$

$$(EcSiO_{3/2})_x(GpMeSiO_{2/2})_{y1}((Me)_2SiO_{2/2})_{y2} \quad \text{Formula 1-13}$$

$$(GpSiO_{3/2})_x(GpMeSiO_{2/2})_{y1}((Me)_2SiO_{2/2})_{y2} \quad \text{Formula 1-14}$$

$$(OpSiO_{3/2})_x(GpMeSiO_{2/2})_{y1}((Me)_2SiO_{2/2})_{y2} \quad \text{Formula 1-15}$$

$$(EcSiO_{3/2})_x(EcMeSiO_{2/2})_{y1}(GpMeSiO_{2/2})_{y2} \quad \text{Formula 1-16}$$

$$(GpSiO_{3/2})_x(EcMeSiO_{2/2})_{y1}(GpMeSiO_{2/2})_{y2} \quad \text{Formula 1-17}$$

$$(OpSiO_{3/2})_x(EcMeSiO_{2/2})_{y1}(GpMeSiO_{2/2})_{y2} \quad \text{Formula 1-18}$$

wherein, in Formulae 1-10 through 1018, Ec is a (3,4-epoxycyclohexyl)ethyl group; Me is a methyl group; Gp is a 3-glycidoxypropyl group; Op is a 3-oxetanylpropyl group; $0.80 \leq x \leq 0.99$; $0 < y1 < 1$; $0 < y2 < 1$; $0.01 \leq y1+y2 \leq 0.20$ and $x+y1+y2=1$.

3. A flexible window film, comprising:
a base layer; and
a coating layer on a surface of the base layer, the coating layer being formed from the composition according to claim 1.

4. The flexible window film according to claim 3, further comprising:
an adhesive layer on an other surface of the base layer.

5. The flexible window film according to claim 3, wherein the flexible window film has a pencil hardness of about 7H or higher, a radius of curvature of about 5.0 mm or lower, and a difference in yellow index before and after irradiation (ΔY.I.) of about 5.0 or less.

6. A flexible display comprising the flexible window film according to claim 3.

7. The flexible display according to claim 6, comprising:
a display unit;
an adhesive layer on the display unit;
a polarizing plate on the adhesive layer;
a touchscreen panel on the polarizing plate; and
the flexible window film on the touchscreen panel.

8. The flexible display according to claim 6, comprising:
a display unit;
a touchscreen panel on the display unit;
a polarizing plate on the touchscreen panel; and
the flexible window film on the polarizing plate.

9. The flexible display according to claim 6, comprising:
a display unit;
an adhesive layer on the display unit; and
the flexible window film on the adhesive layer.

10. The flexible display according to claim 9, further comprising:
a polarizing plate on an upper or lower side of the display unit.

11. A composition for a window film, comprising:
a siloxane resin represented by Formula 1;
an initiator; and
a crosslinking agent present in the composition in an amount of about 0.1 parts by weight to about 50 parts by weight, based on 100 parts by weight of the siloxane resin, the crosslinking agent being selected from the group consisting of non-cyclic aliphatic epoxy monomers, cyclic aliphatic epoxy monomers, aromatic epoxy monomers, hydrogenated aromatic epoxy monomers, oxetane monomers, and combinations thereof, $$(R^1SiO_{3/2})_x(R^2R^3SiO_{2/2})_y \quad \text{Formula 1}$$

wherein:
R¹ is a crosslinkable functional group;
R² and R³ are each independently hydrogen, a crosslinkable functional group, an unsubstituted or substituted $C_1$ to $C_{20}$ alkyl group, or an unsubstituted or substituted $C_5$ to $C_{20}$ cycloalkyl group;
at least one of R² and R³ is an unsubstituted or substituted $C_1$ to $C_{20}$ alkyl group;
$0<x<1$;
$0<y<1$; and
$x+y=1$.

12. A flexible window film, comprising:
a base layer; and
a coating layer on a surface of the base layer, the coating layer being formed from the composition according to claim 11.

13. The flexible window film according to claim 12, further comprising:
an adhesive layer on an other surface of the base layer.

14. A flexible display comprising the flexible window film according to claim 12.

15. A flexible window film, comprising:
a base layer; and
a coating layer on a surface of the base layer, the coating layer being formed from a composition for a window film, the composition comprising:
a siloxane resin represented by Formula 1; and
an initiator, $$(R^1SiO_{3/2})_x(R^2R^3SiO_{2/2})_y \quad \text{Formula 1}$$

wherein:
R¹ is a crosslinkable functional group;

R² and R³ are each independently hydrogen, a crosslinkable functional group, an unsubstituted or substituted $C_1$ to $C_{20}$ alkyl group, or an unsubstituted or substituted $C_5$ to $C_{20}$ cycloalkyl group;

at least one of R² and R³ is an unsubstituted or substituted $C_1$ to $C_{20}$ alkyl group;

$0<x<1$;

$0<y<1$; and $x+y=1$, the flexible window film having a pencil hardness of about 7H or higher, a radius of curvature of about 5.0 mm or lower, and a difference in yellow index before and after irradiation (ΔY.I.) of about 5.0 or less.

16. The flexible window film according to claim 15, further comprising:

an adhesive layer on an other surface of the base layer.

17. A flexible display comprising the flexible window film according to claim 15.

\* \* \* \* \*